Dec. 29, 1970 S. E. SUMMER 3,551,788
HIGH VOLTAGE TRANSISTORIZED STACK WITH
LEAKAGE CURRENT COMPENSATION
Filed Sept. 13, 1968

INVENTOR.
STEVEN E. SUMMER
BY
Hopgood & Calimafde
ATTORNEYS

United States Patent Office 3,551,788

Patented Dec. 29, 1970

3,551,788

HIGH VOLTAGE TRANSISTORIZED STACK WITH LEAKAGE CURRENT COMPENSATION

Steven E. Summer, Hauppauge, N.Y., assignor to Servo Corporation of America, Hicksville, N.Y., a corporation of New York Filed Sept. 13, 1968, Ser. No. 759,711
Int. Cl. G05f *1/56*
U.S. Cl. 323—22 4 Claims

ABSTRACT OF THE DISCLOSURE

A high voltage variable impedance stack circuit is described which uses transistors to control the impedance. A plurality of transistor emitter follower stages are connected in series and selectively interconnected by two high voltage bleeder strings of series-connected resistors to compensate for leakage current effects and improve the high-voltage-sustaining capability of the entire stack. Several high voltage control circuits are shown.

Figures 1, 2, 3:
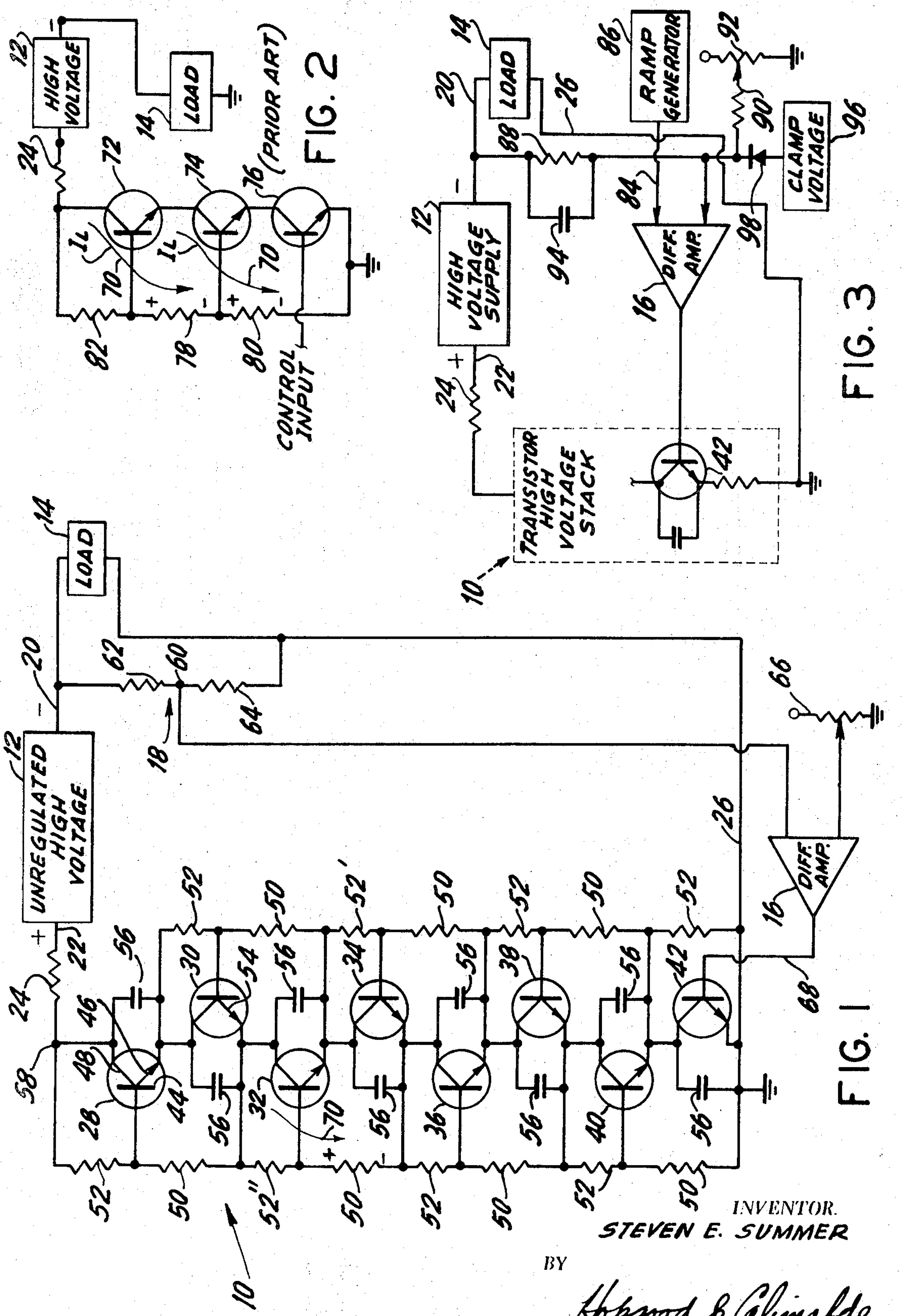

This invention relates to a high voltage variable impedance device. More specifically, it relates to a transistorized variable impedance device for controlling a high voltage power source.

In a typical regulated high voltage power source, a voltage-controllable device may be used in series connection with an unregulated power supply for series regulation thereof. The control device may be considered a variable impedance which, for on-off type control, must be capable of sustaining the entire high voltage of the unregulated supply. There are, of course, other high voltage applications where a variable impedance device capable of sustaining a large voltage is needed, e.g. in high voltage, high power radio frequency transmitters.

When the high voltage control device employs transistors, care must be taken to avoid exceeding their rated voltages (collector to emitter and collector to base). It is therefore customary to connect transistors in series with one another so that each may carry an equal proportioned share of the total high voltage to be controlled. The series connection of transistors as practiced in the prior art, however, required extensive voltage de-rating of the transistors to compensate for the effect of collector-to-base leakage currents.

Although transistors capable of sustaining very high voltages are in development, such transistors include special design features which render the device expensive and at best still subject to the transistor defects such as collector-to-base junction leakage currents.

In prior art transistorized high voltage control devices, the leakage current produces a cumulatively bad effect on the entire performance of the device, especially where several transistors are stacked in series between one another so that each proportionally shares a part of a high voltage applied across the device. The leakage current tends to produce unequal sharing of power dissipations and unequal distribution of the high voltage across the stacked transistors. Since leakage current generally increases directly with temperature and voltage, the leakage current in prior art stacked transistors limited these stacks in the high voltage they could control and made the device quite unreliable with varying temperatures.

It is therefore an object of my invention to provide a transistorized high voltage control device.

It is a further object of this invention to provide a transistor circuit which is usable with voltages higher than heretofore possible with low-cost components and with high stability and reliability.

It is still further an object of this invention to provide an economical high voltage power supply regulator circuit utilizing transistors in stack formation and wherein equal voltage-sharing and power-dissipation-sharing is assured.

These objects are accomplished by my invention, several embodiments of which are described as follows in conjunction with the drawings, wherein FIG. 1 is a schematic representation of a high voltage control circuit in accordance with my invention;

FIG. 2 is a schematic representation of a high voltage stack of transistors arranged in the manner of the prior are; and FIG. 3 is a schematic representation of a sweep voltage circuit using a high voltage stack in accordance with the invention.

Briefly stated, my invention contemplates arranging a plurality of like transistor stages in series connection and providing selected stages with a bias resistor and a voltage-distributing resistor which also acts as a negative feedback resistor. The resistors are series connected to form two strings of high voltage bleeders which are selectively interconnected to the transistor stages to significantly reduce the effect of leakage current and produce a high voltage stack circuit capable of sustaining a very high voltage.

In FIG. 1, a high voltage stack generally indicated at 10 is shown effectively in series between an unregulated D.C. high voltage power source 12 and a load 14 wherein the stack acts as a series regulator and may be, therefore, considered a variable impedance device. A control signal for controlling the stack 10 is obtained from the output of a differential amplifier 16.

The unregulated high voltage power source 12 is applied across two terminals 20–22, negative and positive respectively. The negative terminal 20 is directly coupled to the load 14 and to the actual load-voltage-sensing circuit 18. The load may be the cathode of a klystron or a traveling wave tube where it is customary to ground the plate electrode and render the cathode electrode highly negative.

The positive terminal 22 is effectively coupled through a ballast resistor 24 to one end of the stack 10 which has its other end coupled via ground terminal 26 to the load.

The stack includes eight series-connected transistor emitter follower stages 27–30–32–34–36–38–40–42, each stage being a like polarity (NPN) transistor having a base 44 and a pair of power electrodes 46–48 such as emitter 46 and collector 48 where the collector is the input power electrode and the emitter the output power electrode. Most of the stages further are provided with a like bias resistor 50 coupled to a base 44 and a like voltage-distributing resistor 52–52′–52″ coupling the base of, for instance, transistor 32 to the emitter 54 of adjacent high voltage level transistor 30. Across each collector and emitter of a transistor is a transient suppressing capacitor 56. The top or highest voltage level transistor stage 28 has its collector coupled to junction 58 and thus effectively to the positive terminal 22 of the unregulated high voltage power source 12. The lowest voltage level transistor stage 42 is not provided with a bias resistor like the other stages but is driven by the differential amplifier 16.

The resistors in the stack may thus be considered to be composed of two series-connected high voltage bleeder strings of like resistors, with a first string coupled between the junction 58 and the ground terminal 26, and a second string coupled between the emitter of transistor 28 and the ground terminal 26. Alternate junctions of the first string are coupled to bases of transistors 28–32–36–40, and alternate junctions between resistors of the second string are coupled to the bases of transistors 30–34–38. The other junctions of the strings of resistors are alternately couples to emitters of the transistors as shown in FIG. 1.

The differential amplifier 16 has two inputs, one of which is coupled to junction 60 in the load-sensing circuit 18. Junction 60 is located in a voltage divider network formed by resistors 62–64 which are connected in series between the negative terminal 20 and the ground terminal 26. The voltage at junction 60 represents the actual voltage, of power in case of a resistive load, delivered to the load.

The other input to differential amplifier 16 is derived from a reference network formed by a variable resistor 66 and a stable voltage source (not shown). The reference network produces a voltage representative of a desired output voltage level of the output power source across the load.

The operation of the high voltage stack circuit of FIG. 1 is as follows. Assume a positive voltage error is produced at the output terminal 68 of differential amplifier 16, calling for a greater voltage across the load and thus a reduction in the effective impedance of the stack 10. The positive error voltage is applied to the base of low end transistor 42 and increases conduction thereof with a resultant drop in its collector voltage. The drop in collector voltage of transistor 42 causes the emitter of transistor 40 to go negative relative to its base and causes transistor 40 to increase its conduction. This process is continued all the way up the stack until the new load voltage called for by the error signal is established. Each stage now shares across it a proportional share of the difference between the unregulated voltage and the load voltage. If the unregulated voltage is, say 2500 volts, and the load voltage is 900 volts, then the voltage across each of the eight transistor stages is approximately 200 volts. This means that the power dissipation for each stage is also approximately the same.

The sharing of the total high voltage by each of the stages as accomplished by the novel circuit of FIG. 1 may best be understood in relation to the effect of the collector-to-base reverse junction current, i.e. from collector to base for an NPN transistor (as shown by arrow 70) and from base to collector for a PNP polarity transistor. An appreciation of the effect of the leakage current may be obtained from its relatively large magnitude at high temperatures and high voltages across the collector-base junctions. The leakage current may be as high as one milliampere and with bias resistors of 100,000 ohms this establishes significant bias effects.

The leakage current flow for transistor 32 is as shown by the arrow 70 and establishes a potential as indicated across the bias resistor 50 coupled between the base of transistor 32 and the emitter of transistor 34. Since the transistor stages are emitter followers, the emitter of transistor 32 follows the increased base potential caused by the leakage current. The increased potential of this emitter is now distributed by the resistor 52′ which interconnects the emitter of transistor 32 to the base of transistor 34. The distribution is dependent upon the voltage divider network formed by the latter resistor 52′ and the effective high input impedance of the transistor 34; i.e. approximately one-third of the voltage change caused by the leakage current is transferred to the base of the next lower voltage stage 34 and thus also to the emitter of the latter transistor. In this manner resistor 52′ acts as a voltage distributor and forces lower voltage stages to absorb part of the leakage current effect of higher stages. Since each stage has some leakage current, the voltage adjustments down the string tend to be uniform.

When the voltage across resistor 50 increases due to the leakage current, a part of this is coupled back in a negative feedback manner by resistor 52″ to the emitter of the adjacent high voltage transistor 30. The amount of this negative feedback is determined by the voltage divider effect by resistor 52″ and the effective generally low resistance presented by the emitter 54 of the transistor 30. This negative feedback effectively is a reverse bias voltage applied to the base-emitter junction of transistor 30 and thus reduces conduction of the latter, tending to increase its share of the total high voltage and correspondingly decrease the high voltage across transistor 32. In summary, voltage adjustments are made up and down the stack for local stage defects due to the inclusion of resistors 52–52′–52″.

If one considers the leakage current for transistor 30, the resistor 52″ now functions as a voltage distributor. Also the function of resistor 52′ is that of a negative feedback resistor in view of the leakage current in the transistor 34. In view of this dual function of the resistors 52–52′–52″, it is referred to as a voltage-distributing resistor.

The advantage of my double string bleeder circuit becomes now readily apparent in view of prior art high voltage stacks. FIG. 2 illustrates a prior art stack of three series-connected transistor stages 72–74–76. The prior art stack includes a single string of series-connected bias resistors 78–80 coupled to the unregulated supply via resistor 82. A control input from a source (not shown) is coupled to the base of transistor 76. The leakage current paths are as shown by the arrow 70. Note that in the absence of the feedback resistors of my invention, the effects of the leakage currents accumulate, thereby limiting the number of stages one can employ. The leakage current of transistor 72 establishes a forward bias across resistor 78 and causes an increased transistor collector-to-emitter current flow with a reduced voltage across the transistor 72. This in turn increases the voltage at the collector of transistor 74 which in turn increases the leakage current in the latter with the same effect as with transistor 72. When the leakage current effect accumulates excessively, transistor 76 may be required to control a larger voltage than its proportional share. The net result of the prior art stack circuit is a reduced efficiency in handling large high voltage potentials.

The circuit of my invention, however, compensates for the effect of the collector-to-emitter leakage current around each transistor stage so that the stack is capable of handling high voltage potentials without accumulating the effects of leakage currents, thereby more evenly distributing the high voltage across each stage which may now use low voltage, low cost transistors.

In the circuit of FIG. 3, the high voltage stack circuit is used to generate a ramp-shaped high voltage across output terminals 20–26. A low ramp reference voltage is obtained on line 84 from a conventional sawtooth generator network 86. The ramp voltage is applied to one input of differential amplifier 16. A feedback voltage is coupled back from the high voltage terminal 20 and divided by voltage divider network formed by series-coupled resistors 88 and 90 and part of variable resistor 92. A speed-up capacitor 94 is placed across resistor 88 to improve the high frequency response of the high voltage ramp generator. A clamp voltage source 96 back-biases a diode 98 which is coupled to the feedback input of differential amplifier 16 to prevent that input from going too far negative. The output of differential amplifier 16 is again coupled to the base of transistor 42 as in FIG. 1.

As the ramp generator produces a positively increasing voltage, the voltage to the load increases (in absolute magnitude) though it becomes more negative in value. The feedback connection assures that the load voltage closely follows the ramp voltage and the control voltage at the output of differential amplifier 16 represents an error signal of a polarity to assure a true magnified reproduction of the low voltage ramp signal across terminals 20–26.

Having thus described my invention, noteworthy features become readily apparent. The embodiments show a novel high voltage transistor stack circuit which performs with greater linearity, is economical, highly stable with varying temperatures, and capable of handling high voltages.

I claim:

1. A device for controlling the supply of a high voltage source to a load comprising a source of unregulated high voltage power applied across a pair of terminals with one terminal effectively coupled to the load, a stack of like polarity series-connected transistors each having a base and a pair of unlike power electrodes with a power electrode of one transistor coupled to an unlike power electrode of an adjacent transistor, said stack interconnecting the other terminal of the unregulated supply with the load, with a first transistor in the stack having a power electrode coupled to the other terminal and with a last transistor located at the other end of the stack from the first transistor having a power electrode coupled to the load, a first voltage bleeder string of series-coupled resistors interconnected at junctions with one end of the first string coupled to said terminal and with the other end effectively coupled to said load-coupled power electrode of the last transistor, a second voltage bleeder string of series-coupled resistors interconnected at junctions with one end of the second string coupled to the other power electrode of the first transistor and with alternate junctions in the first string coupled to bases of alternate transistors and with alternate junctions in the second string coupled to bases of other than said alternate transistors, with the remaining junctions in said first and second string of resistors coupled alternately to junctions of connected power electrodes of adjacent transistors, and means for producing a control signal and applying said control signal to the base of said last transistor to control the supply of high voltage power to the load.

2. The device as recited in claim 1, and further comprising a transient suppressing capacitor coupled across the input and output power electrodes of each transistor.

3. The device as recited in claim 1, wherein said means further comprises means for producing a reference signal representative of a desired high voltage delivered to the load, means for producing a signal of the actual high voltage delivered to the load, and wherein said control-signal-producing means is responsive to the reference signal and the actual delivered high voltage signal for the regulation of the high voltage delivered to the load.

4. The device as recited in claim 3, wherein the reference-signal-producing means includes a sweep circuit producing a low ramp voltage, and wherein said control-signal-producing means includes a differential amplifier responsive to said low ramp voltage and the actual delivered high voltage signal to provide a high voltage ramp-shaped voltage to the load.

References Cited

UNITED STATES PATENTS

| | | | |
|---|---|---|---|
| 3,018,433 | 1/1962 | Stone | 323—22(T)X |
| 3,150,310 | 9/1964 | Ault | 323—22(T) |
| 3,202,904 | 8/1965 | Madland | 323—22(T)X |

J D MILLER, Primary Examiner

G. GOLDBERG, Assistant Examiner

U.S. Cl. X.R.

307—297